(12) United States Patent
Hooli et al.

(10) Patent No.: US 8,989,308 B2
(45) Date of Patent: Mar. 24, 2015

(54) APPARATUS AND METHOD FOR SINGLE USER MULTIPLE INPUT MULTIPLE OUTPUT COMMUNICATION EMPLOYING CYCLIC SHIFTS

(75) Inventors: Kari Juhani Hooli, Oulu (FI); Kari Pekka Pajukoski, Oulu (FI); Esa Tapani Tiirola, Kempele (FI)

(73) Assignee: Nokia Siemens Networks Oy, Espoo (FI)

( * ) Notice: Subject to any disclaimer, the term of this patent is extended or adjusted under 35 U.S.C. 154(b) by 356 days.

(21) Appl. No.: 13/202,599

(22) PCT Filed: Feb. 27, 2009

(86) PCT No.: PCT/EP2009/052379
§ 371 (c)(1),
(2), (4) Date: Aug. 22, 2011

(87) PCT Pub. No.: WO2010/097121
PCT Pub. Date: Sep. 2, 2010

(65) Prior Publication Data
US 2011/0299625 A1    Dec. 8, 2011

(51) Int. Cl.
*H04L 27/00* (2006.01)
*H04L 27/26* (2006.01)
*H04L 5/00* (2006.01)
*H04J 13/00* (2011.01)

(52) U.S. Cl.
CPC ......... *H04L 27/2613* (2013.01); *H04J 13/0062* (2013.01); *H04J 13/0074* (2013.01); *H04L 5/005* (2013.01); *H04L 5/0051* (2013.01)
USPC .......................................... 375/299; 375/267

(58) Field of Classification Search
USPC ........................................ 375/267, 299, 260
See application file for complete search history.

(56) References Cited

U.S. PATENT DOCUMENTS

| 8,634,363 | B2 * | 1/2014 | Kim et al. ...................... 370/329 |
| 8,638,722 | B2 * | 1/2014 | Wang et al. ................... 370/328 |
| 2007/0021075 | A1 | 1/2007 | Nakao |
| 2009/0168730 | A1 * | 7/2009 | Baum et al. ................... 370/336 |
| 2010/0118799 | A1 * | 5/2010 | Lee et al. ...................... 370/329 |
| 2011/0171964 | A1 * | 7/2011 | Lin et al. ....................... 455/450 |
| 2011/0274067 | A1 * | 11/2011 | Lee et al. ...................... 370/329 |
| 2012/0033643 | A1 * | 2/2012 | Noh et al. ..................... 370/335 |

(Continued)

FOREIGN PATENT DOCUMENTS

| RU | 2234196 C2 | 8/2004 |
| WO | WO 2007/084988 A2 | 7/2007 |

(Continued)

OTHER PUBLICATIONS

R1-074865, "UL DM RS for Multi-bandwidth Multi-user MIMO", 3GPP TSG RAN WG1 Meeting #51, Jeju, Korea, Nov. 5-9, 2007, Nokia Siemens Networks, Nokia, 3 pgs.

(Continued)

*Primary Examiner* — Emmanuel Bayard
(74) *Attorney, Agent, or Firm* — Harrington & Smith

(57) ABSTRACT

Apparatus and method for communication are provided. The apparatus includes one or more antenna ports; and a processor configured to share a cyclic shift space of reference signals of user equipment utilizing single user multiple input multiple output transmission by applying a cyclic shift increment value between reference signals of different antenna ports or spatial layers of the user equipment transmission.

31 Claims, 5 Drawing Sheets

(56) References Cited

U.S. PATENT DOCUMENTS

| | | | |
|---|---|---|---|
| 2012/0044906 A1* | 2/2012 | Chen et al. | 370/329 |
| 2012/0140843 A1* | 6/2012 | Sartori et al. | 375/295 |
| 2012/0170444 A1* | 7/2012 | Ogawa et al. | 370/209 |
| 2012/0176885 A1* | 7/2012 | Lee et al. | 370/209 |
| 2012/0207084 A1* | 8/2012 | Seo et al. | 370/315 |
| 2012/0236741 A1* | 9/2012 | Xu et al. | 370/252 |
| 2012/0243500 A1* | 9/2012 | Chandrasekhar et al. | 370/330 |
| 2012/0250608 A1* | 10/2012 | Wang et al. | 370/328 |
| 2012/0320849 A1* | 12/2012 | Frederiksen et al. | 370/329 |
| 2012/0327981 A1* | 12/2012 | Sayana et al. | 375/219 |
| 2013/0021984 A1* | 1/2013 | Han et al. | 370/329 |
| 2013/0201964 A1* | 8/2013 | Kim et al. | 370/335 |
| 2013/0279626 A1* | 10/2013 | Noh et al. | 375/295 |
| 2014/0016714 A1* | 1/2014 | Chen et al. | 375/260 |

FOREIGN PATENT DOCUMENTS

| | | | |
|---|---|---|---|
| WO | WO 2008/081311 A2 | 7/2008 | |
| WO | WO 2008/132073 A1 | 11/2008 | |
| WO | WO 2008/149314 A2 | 12/2008 | |

OTHER PUBLICATIONS

R1-081444, "Cyclic Shift Value Definition for PUSCH Demodulation RS", 3GPP TSG RAN WG1 Meeting #52 bis, Shenzhen, China, Mar. 31-Apr. 4, 2008, Nokia Siemens Networks, Nokia, 2 pgs.

R1-084199, "Uplink MIMO Transmission for LTE-Advanced" 3GPP TSG RAN WG1 Meeting #55, Prague, Czech Republic, Nov. 10-14, 2008, LG Electronics, 6 pgs.

3GPP TS 36.211 V8.4.0 (Sep. 2008), 3rd Generation Partnership Project, Technical Specification Group Radio Access Network, Evolved Universal Terrestrial Radio Access (E-UTRA), Physical Channels and Modulation (Release 8); (78 pages).

\* cited by examiner

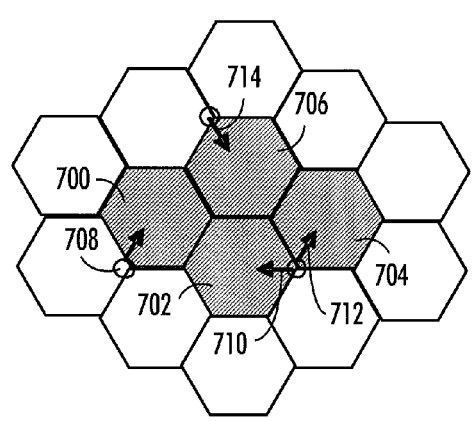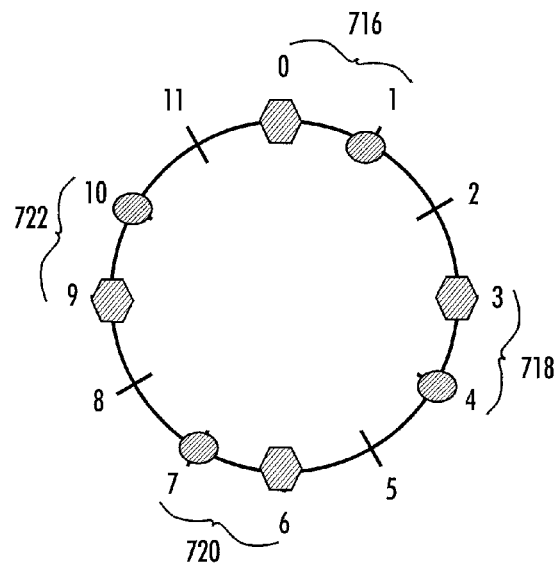
FIG. 7A                               FIG. 7B
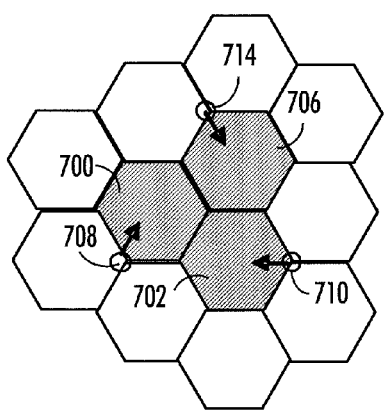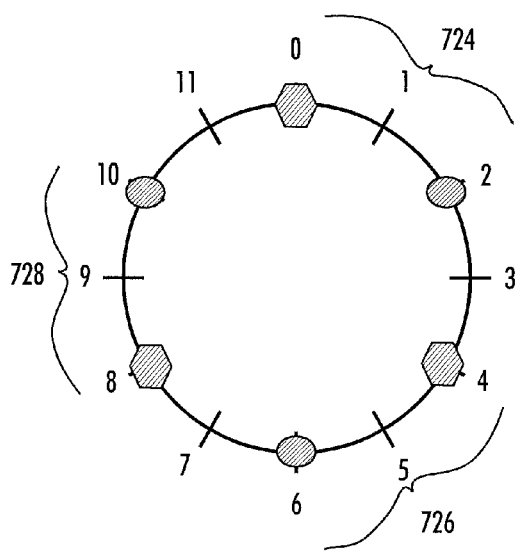
FIG. 7C                               FIG. 7D

APPARATUS AND METHOD FOR SINGLE USER MULTIPLE INPUT MULTIPLE OUTPUT COMMUNICATION EMPLOYING CYCLIC SHIFTS

FIELD

The exemplary and non-limiting embodiments of the invention relate generally to wireless communication networks and more specifically, to sharing cyclic shift space of signals.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

In data links, the transmission path used for transmitting signals is known to cause interference in telecommunication. Another main cause for errors in communication is thermal noise. In order to diminish the effects of thermal noise and interference caused by the transmission path, efficient transmission methods are required.

In many systems, coherent detection is utilized in receivers. In coherent detection, the carrier phase of the received signal must be detected at the receiver. In non-coherent detection, phase information is not required. However, due to better performance, coherent detection is widely used although the receiver complexity is greater. It is common to add a reference signal to a payload signal so that the signal may be received coherently at a receiver. In some moderns systems, constant amplitude zero autocorrelation waveform (CAZAC) sequences are used as reference signals. Cyclic shift versions of a CAZAC sequence have high orthogonality with each other. Thus, cyclic shifted versions of such a sequence may be used as a reference signal. Also other sequences may be used, such as computer searched Zero-Autocorrelation (ZAC) sequences.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

According to an aspect of the present invention, there is provided an apparatus comprising: one or more antenna ports; and a processor configured to share a cyclic shift space of reference signals of user equipment utilizing single user multiple input multiple output transmission by applying a cyclic shift increment value between reference signals of different antenna ports or spatial layers of the user equipment transmission.

According to another aspect of the present invention, there is provided a method comprising: sharing a cyclic shift space of reference signals of user equipment utilizing single user multiple input multiple output transmission by applying a cyclic shift increment value between reference signals of different antenna ports or spatial layers of the user equipment transmission.

According to an aspect of the present invention, there is provided an apparatus comprising: a processor configured to control the cyclic shift of reference signals of user equipment utilizing single user multiple input multiple output transmission by determining a cyclic shift increment value between reference signals of different user equipment, antenna ports or spatial layers of the user equipment transmission.

According to another aspect of the invention, there is provided a method comprising: controlling the cyclic shift of reference signals of user equipment utilizing single user multiple input multiple output transmission by determining a cyclic shift increment value between reference signals of different user equipment, antenna ports or spatial layers of the user equipment transmission.

According to another aspect of the present invention, there is provided a computer readable memory embodying a program of instructions executable by a processor to perform actions directed toward sharing a cyclic shift space of reference signals of user equipment utilizing single user multiple input multiple output transmission, the actions comprising: applying a cyclic shift increment value between reference signals of different antenna ports or spatial layers of the user equipment transmission.

According to yet another aspect of the invention, there is provided a computer readable memory embodying a program of instructions executable by a processor to perform actions directed toward controlling the cyclic shift of reference signals of user equipment utilizing single user multiple input multiple output transmission, the actions comprising: determining a cyclic shift increment value between reference signals of different user equipment, antenna ports or spatial layers of the user equipment transmission.

LIST OF DRAWINGS

Embodiments of the present invention are described below, by way of example only, with reference to the accompanying drawings, in which FIG. 1 shows a simplified block diagram illustrating an exemplary system architecture;

FIGS. 7A, 7B, 7C and 7D illustrate embodiments of the invention; and

DESCRIPTION OF SOME EMBODIMENTS

Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments of present invention are applicable to any user terminal, server, corresponding component, and/or to any communication system or any combination of different communication systems utilizing reference signals and cyclic shift of reference signals. The communication system may be a wireless communication system or a communication system utilizing both fixed networks and wireless networks. The protocols used and the specifications of communication systems, servers and user terminals, especially in wireless communication, develop rapidly. Such development may require extra changes to an embodiment. Therefore, all words and expressions should be interpreted broadly and are intended to illustrate, not to restrict, the embodiment.

In the following, different embodiments will be described using, as an example of a system architecture to which the embodiments may be applied, an architecture based on the third-generation wireless communication system UMTS (Universal Mobile Telecommunication System) without restricting the embodiment to such an architecture, however.

Figure 1:
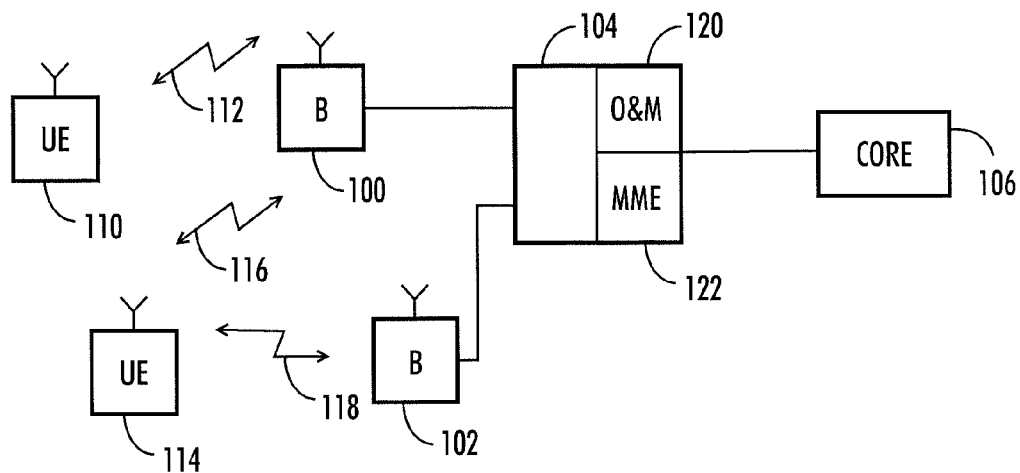

A general architecture of a communication system is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements, and protocols used in or for group communication are irrelevant to the actual invention. Therefore, they need not be discussed in more detail here.

FIG. 1 shows two base stations or Node Bs 100 and 102. Base stations 100 and 102 are connected to a common server 104 of the network. The common server 104 may include an operation and maintenance (O&M) server 120 and a mobility management server 122. Typically, the functionalities of the O&M server include initial cell-level radio resources allocation, performance monitoring, for example. The functionalities of the mobility management server may take care of routing the connections of user equipment. The connections between the node Bs and the servers may be implemented by using Internet Protocol (IP) connections.

The communication network may further comprise a core network 106 connected to the common server 104.

FIG. 1 shows user equipment 110 communicating 112 with the node B 100 and user equipment 114 communicating 116, 118 with node Bs 100 and 102. The user equipment refers to a portable computing device. Such computing devices include wireless mobile communication devices operating with or without a subscriber identification module (SIM), including, but not limited to, the following types of devices: mobile phone, smartphone, personal digital assistant (PDA), handset, laptop computer.

FIG. 1 only illustrates a simplified example. In practice, the network may include more base stations and radio network controllers, and more cells may be formed by the base stations. The networks of two or more operators may overlap, the sizes and form of the cells may vary from that depicted in FIG. 1, etc.

It should be appreciated that the base stations or node Bs may also be connectable to core network elements directly (not shown in the Figure). Depending on the system, the counterpart on the core network side can be a mobile services switching centre (MSC), a media gateway (MGW), or a serving GPRS (general packet radio service) support node (SGSN), home node B gateway (HNB-GW), mobility management entity and enhanced packet core gateway (MME/EPC-GW), etc. A direct communication between different node Bs over the air interface is also possible by implementing a relay node concept, wherein a relay node may be considered as a special node B having wireless backhauls or, e.g., X2 and S1 interfaces relayed over the air interface by another node B. The communication system is also able to communicate with other networks, such as a public switched telephone network.

The embodiments are not, however, restricted to the network given above as an example, but a person skilled in the art may apply the solution to other communication networks provided with the necessary properties. For example, the connections between different network elements may be realized with Internet Protocol (IP) connections.

In an embodiment, the user equipment 110 communicates with the base station using single user multiple input multiple output (SU-MIMO). In SU-MIMO, user equipment utilizes more than one antenna in communicating with base stations. Typically, the number of antennas may be two to four. However, the number of antennas is not limited to any specific number. SU-MIMO has been suggested to be applied in the LTE-Advanced communication system (Long Term Evolution-Advanced) which is an evolution of the LTE system currently in development. The LTE-Advanced is being researched by an international consortium 3GPP (Third Generation Partnership Project).

In an embodiment, Multi-User multiple input multiple output (MU-MIMO) is utilised in the system. In MU-MIMO, multiple users in a cell are utilising the same transmission resources.

Another technology planned to be used in the LTE-Advanced system is Coordinated Multi-Point (CoMP). CoMP applied in uplink transmission direction implies the reception of the transmission of user equipment at multiple, geographically separated points.

One important aspect in designing SU-MIMO, MU-MIMO and CoMP is the realization of reference signals used in the transmission to aid coherent reception at the receiver.

In the LTE and LTE-Advanced systems, Zadoff-Chu (ZC) CAZAC sequences and modified ZC sequences are used as reference signals or pilot signals. Modified CZ sequences comprise truncated, extended ZC sequences and computer searched zero-autocorrelation (ZAC) sequences.

Figure 2:
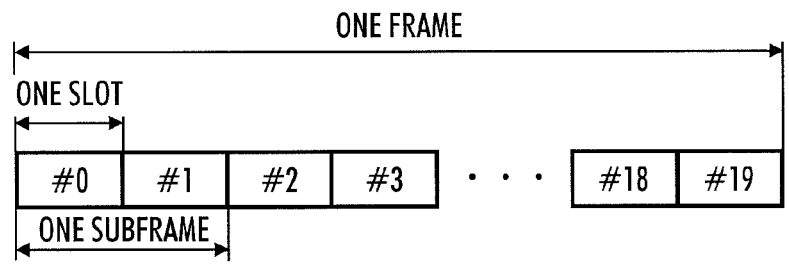
FIG. 2 illustrates an example of the frame structure of uplink LTE-Advanced transmission.

FIG. 2 illustrates an example of the frame structure of uplink LTE-Advanced transmission. The frame comprises 20 time slots, numbered from 0 to 19. A subframe is defined as two consecutive time slots, where subframe i comprises time slots 2i and 2i+1. In each time slot, one to three reference signal blocks are transmitted.

In the present LTE system, different user equipment transmitting data-non-associated control signals in a cell utilize the same ZC sequence as a reference signal. The ZC sequence used may be called a mother sequence or a root sequence. The transmissions of different user equipment are separated by applying different cyclic shifts of the ZC sequence. In addition, block level spreading may be applied to separate reference signals from each other. The orthogonality of reference signals is limited by the properties of ZC sequences, delay-spread (regarding cyclic shifts) and Doppler (regarding block level spreading).

Figure 3:
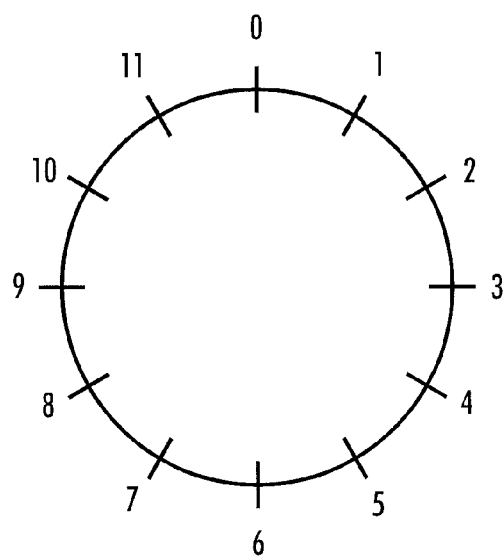
FIG. 3 illustrates an example of the available cyclic shifts for a ZC sequence having a length of 12 symbols.

FIG. 3 illustrates the available cyclic shifts for a ZC sequence having a length of 12 symbols. The cyclic shifts may be shown as a clock where different shifts are marked as 0, 1, 2, 3, . . . , 11. Due to the autocorrelation properties of the ZC sequences, the best orthogonality is obtained between cyclic shifts having the largest difference in the cyclic shift domain. Thus, opposed shifts (CS0 and CS6 or CS3 and CS9, for example) in the clock lead to the best orthogonality. The worst orthogonality is between adjacent cyclic shifts (CS1 and CS0 or CS2, for example).

In a current LTE specification, the user equipment specific component of the cyclic shift of a user equipment reference signal is based on the following table

TABLE 1

| Cyclic shift field | Cyclic shift slot |
| --- | --- |
| 000 | 0 |
| 001 | 6 |
| 010 | 3 |
| 011 | 4 |
| 100 | 2 |
| 101 | 8 |
| 110 | 10 |
| 111 | 9 | where the cyclic shift field is a parameter from higher layers and the cyclic shift slot describes the selected shift on the clock of FIG. 3.

Figure 4:
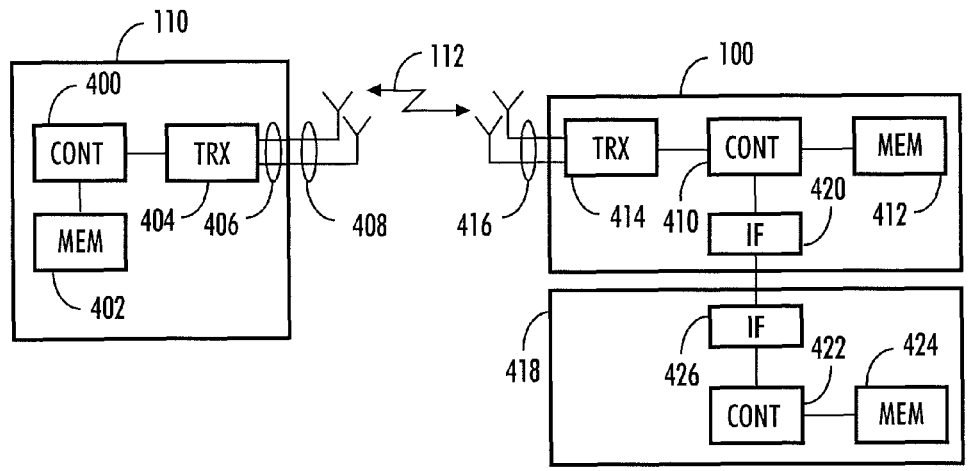
FIG. 4 illustrates examples of apparatuses according to embodiments of the invention.

FIG. 4 illustrates examples of apparatuses according to embodiments of the invention. FIG. 4 shows user equipment 110 configured to be in a connection on a communication channel 112 with a base station 100. The user equipment 110 comprises a controller 400 operationally connected to a memory 402 and a transceiver 404. The controller 400 controls the operation of the user equipment. The memory 402 is configured to store software and data. The transceiver is configured to set up and maintain a wireless connection to a base station 100. The transceiver is operationally connected to a set of antenna ports 406 connected to an antenna arrangement 408. The antenna arrangement may comprise a set of antennas. The number of antennas may be two to four, for example. The number of antennas is not limited to any particular number.

The base station or node B 100 comprises a controller 410 operationally connected to a memory 412 and a transceiver 414. The controller 408 controls the operation of the base station. The memory 412 is configured to store software and data. The transceiver 414 is configured to set up and maintain a wireless connection to user equipment within the service area of the base station. The transceiver 414 is operationally connected to an antenna arrangement 416. The antenna arrangement may comprise a set of antennas. The number of antennas may be two to four, for example. The number of antennas is not limited to any particular number.

The base station may be operationally connected to another network element 418 of the communication system. The network element 418 may be a radio network controller, another base station, a gateway, or a server, for example. The base station may be connected to more than one network element. The base station 100 may comprise an interface 420 configured to setup and maintain the connection with the network element. The network element 418 may comprise a controller 422 and a memory 424 configured to store software and data and an interface 426 configured to be in connection with the base station. In an embodiment, the network element is connected to the base station via another network element.

In an embodiment, the user equipment is configured to utilize single user multiple input multiple output (SU-MIMO) transmission on the communication channel 112 with the base station. In SU-MIMO, the antenna arrangement comprises a set of antennas or an antenna array configured to form more than one transmission streams. The transmission streams may be obtained using several antennas, antenna beams or suitably coding, as one skilled in the art is well aware. In an embodiment, multiple spatial layers are applied at the user equipment. In another embodiment, transmission streams are used for transmit antenna diversity. The method with which the SU-MIMO transmission is realized is not relevant regarding the embodiments of the invention.

When SU-MIMO is used in user equipment, the multiple transmission streams may comprise separate reference signals. In an embodiment, the user equipment is configured to share a cyclic shift space of reference signals of user equipment applying a cyclic shift increment value $\Delta_{CS}^{DMRS}$ between reference signals of different antenna ports or spatial layers of the user equipment transmission.

In an embodiment, the cyclic shifts of user equipment reference signals are controlled by a network element, such as the base station 100 or a network element 418. The network element may be configured to determine configurable cyclic shift increment value $\Delta_{CS}^{DMRS}$ according to given criteria and the selected value may be transmitted to the user equipment over a wireless link.

It is possible to determine the cyclic shift increment value $\Delta_{CS}^{DMRS}$ to be common in a given cell, or multiple cells. This applies especially when Coordinated Multi-Point is used. Alternatively, it is possible to define the cyclic shift increment in a UE-specific manner.

In an embodiment, where Multi-user Multiple Input Multiple Output (MU-MIMO) scheduling and/or Coordinated Multi-Point (CoMP) is applied in uplink transmission direction, the network element is configured to determine the configurable cyclic shift increment value $\Delta_{CS}^{DMRS}$ and prioritize the cyclic shift separation between the reference signals of different users in the CoMP area. In this case, the cyclic shift increment value may be determined according to the formula $$\Delta_{CS}^{DMRS} = \min\left(\left\lfloor \frac{N_{CS}}{M \cdot N_{tx}} \right\rfloor, CS_{min}\right), \quad \text{(Eq. 1)}$$

where $N_{CS}$ is the total number of available cyclic shifts, M is the number of mobile units or cells, $CS_{min}$ is the minimum supported cyclic shift separation, and $N_{tx}$ is the maximum number of reference signals per user equipment. $\lfloor\ \rfloor$ denotes the floor operation, where the output of the operation is the largest integer not greater than the argument of the operation.

The network element may be configured to store the required values needed in the determination in a memory. For example, if the base station 100 determines the cyclic shift increment value, the processor 410 and memory 412 are utilised in the determination. Correspondingly, if the network element 418 determines the cyclic shift increment value, the processor 422 and memory 424 are utilised in the determination.

In an embodiment, $N_{CS}$ equals 12. $N_{CS}$ may be quantized to the value of 12 even if the length of a reference signal is greater than 12 elements. M may denote the number of cells belonging to the Coordinated Multi-Point area. Alternatively, M may denote the numbers of user equipment in the cell or in the Coordinated Multi-Point area that are supported for MIMO with the same resources. For example, the system may support three users each having two antennas. $CS_{min}$ may be defined as $CS_{min} \in \{1\ 2\ \Lambda\ (N_{CS}-1)\}$.

In the case where block level spreading is used as the primary orthogonalization scheme between reference signals of the same user equipment which utilizes SU-MIMO, $\Delta_{CS}^{DMRS}$ may be defined assuming at maximum $$\left(\frac{N_{tx}}{N_{SF}^{DMRS}}\right)$$

reference signals per user equipment (instead of $N_{tx}$). Here $N_{SF}^{DMRS}$ is the length of the block spreading code.

Alternatively, a dedicated cyclic shift resource per transmitter antenna or spatial layer may be applied also in the case when block spreading is applied. In this arrangement which provides the good orthogonality properties the reference signals, $\Delta_{CS}^{DMRS}$ is defined assuming at maximum $N_{tx}$ reference signals per user equipment $$\left(\text{instead of}\left(\frac{N_{tx}}{N_{SF}^{DMRS}}\right)\right).$$

In an embodiment, where when the cyclic shift separation between the reference signals of the same user equipment is prioritized, the network element may be configured to determine the configurable cyclic shift increment value $\Delta_{CS}^{DMRS}$ according to the formula $$\Delta_{CS}^{DMRS} = \min\left(\left\lfloor\frac{N_{CS}}{N_{tx}}\right\rfloor, CS_{min}\right), \quad \text{(Eq. 2)}$$

where $N_{CS}$ is the total number of available cyclic shifts, $CS_{min}$ is the minimum supported cyclic shift separation, and $N_{tx}$ is the maximum number of reference signals per user equipment.

In equations 1 and 2, the term $N_{tx}$ may depend on the applied SU-MIMO configuration. In open loop schemes where transmit diversity and spatial multiplexing are applied, $N_{tx}$ equals the number of transmit antennas. In closed loop schemes, where single stream precoding and multi stream precoding are applied, there are two alternatives. With a beam-specific, precoded reference signal, $N_{tx}$ equals the number of spatial streams. With antenna-specific reference signal, $N_{tx}$ equals the number of transmit antennas.

In an embodiment, the base station or the network element may transmit the determined cyclic shift increment value $\Delta_{CS}^{DMRS}$ to user equipment. The signalling charts of FIGS. 5A and 5B illustrate the required signalling.

Figure 5A:
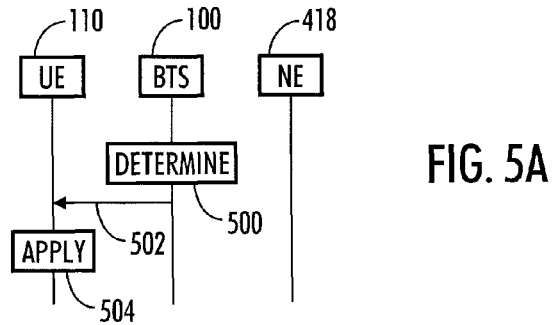
FIGS. 5A and 5B are signalling charts illustrating embodiments of the invention.
Figure 5B:
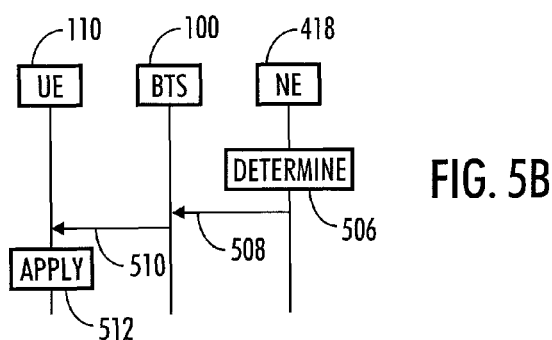

In the example of FIG. 5A, the base station 100 determines 500 the cyclic shift increment value and transmits 502 the value to the user equipment 110. The user equipment 110 and the base station 100 may then apply 504 the value. If the network element which determined the cyclic shift increment value is not the base station, the element may transmit the value to the user equipment via the base station. This is illustrated in the example of FIG. 5B. The network element 418 determines 506 the cyclic shift increment value and transmits 508 the value to the base station 100. The base station 100 transmits 510 the value further to the user equipment 110. The user equipment 110 and the base station 100 may then apply 512.

In an embodiment, a base station signals the value via broadcasted system information. In another embodiment, the value is signalled using user equipment specific higher layer signalling. As explained below, $\Delta_{CS}^{DMRS}$ is not needed when defining the cyclic shift for the first user equipment antenna element. It is also noted that dynamic cyclic shift signalling conveyed on DCI Format 0 can be kept unchanged, compared with prior art LTE systems, such as LTE Release 8.

In an embodiment, the user equipment 110 and the base station 100 are configured to determine transmit antenna or spatial layer specific cyclic shift $n_{CS}(n_{tx})$ according to the following formula:

$$n_{CS}(n_{tx}) = (n_{DMRS}^{(1)} + n_{DMRS}^{(2)} + n_{DMRS}^{(3)}(n_{tx}) + n_{PRS}) \mod 12, \quad \text{(Eq. 3)}$$

where $n_{DMRS}^{(1)}$ is a cell specific broadcasted value, $n_{DMRS}^{(2)}$ is a user equipment specific value given by the uplink scheduling assignment in the form given by Table 1. The fourth term $n_{PRS}$ is a cell specific pseudo-random value and given by $$n_{PRS} = \sum_{i=0}^{7} c(i) \cdot 2^i,$$

where the pseudo-random sequence $c(i)$ is a Gold sequence of length 31, as defined by 3GPP TS 36.211, section 7.2.

The transmit antenna or spatial layer specific term $n_{DMRS}^{(3)}(n_{tx})$ may be calculated as $$n_{DMRS}^{(3)}(n_{tx}) = \Delta_{CS}^{DMRS} \cdot n_{tx} \quad \text{(Eq. 4)}$$

where the reference signal index $n_{tx} \in \{0, 1, \ldots, (N_{tx}-1)\}$.

In an embodiment, where block level spreading is used as the primary orthogonalization scheme between the reference signals of the same user equipment utilizing (SU-MIMO), the transmit antenna or spatial layer specific term $n_{DRMS}^{(3)}(n_{tx})$ is calculated using $\tilde{n}_{tx}$ as the reference signal index. It is defined as follows:

$$\tilde{n}_{tx} \in \left\{\left\lfloor\frac{n_{tx}}{N_{SF}^{DMRS}}\right\rfloor\right\} = \left\{0, 0, 1, 1, \Lambda \frac{N_{tx}-1}{N_{SF}^{DMRS}}\right\}, \quad \text{(Eq. 5)}$$

where $N_{SF}^{DMRS}$ is the length of the block spreading code.

In yet another embodiment, where block spreading is used as an additional orthogonalization scheme between the reference signals of the same user equipment utilizing SU-MIMO, the transmit antenna or spatial layer specific term $n_{DMRS}^{(3)}(n_{tx})$ is calculated using $\tilde{n}_{tx}$ as the reference signal index. In this embodiment, it is defined as follows:

$$\tilde{n}_{tx} \in \{0, 1, \ldots, (N_{tx}-1)\}. \quad \text{(Eq. 6)}$$

In this case it is natural to apply different block-spreading codes for adjacent CS resources.

It is noted that combining of the CS separation and the block level code separation of the reference signals can be made without a need for additional higher layer signalling.

In an embodiment, other reference signal orthogonalization schemes may be used on top of cyclic shift separation when user equipment is applying SU-MIMO transmission. Examples of such schemes are IFDMA (Interleaved Frequency Division Multiple Access) and the already mentioned block level spreading. There are several possibilities to implement these combined reference signal separation schemes.

For example, two orthogonal reference signals having the same cyclic shift can be achieved by means of applying block level spreading on top of two consecutive demodulation resource signal blocks of the subframe. This orthogonal dimension is not available when subframe based frequency hopping is used.

In an embodiment, cyclic shift separation is taken into use only in the case when block level spreading cannot provide enough demodulation resource signal resources.

Figure 6A:
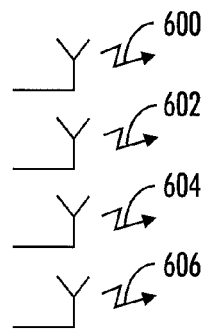
FIGS. 6A, 6B, 6C and 6D illustrate examples of the transmission of reference signals.
Figure 6B:
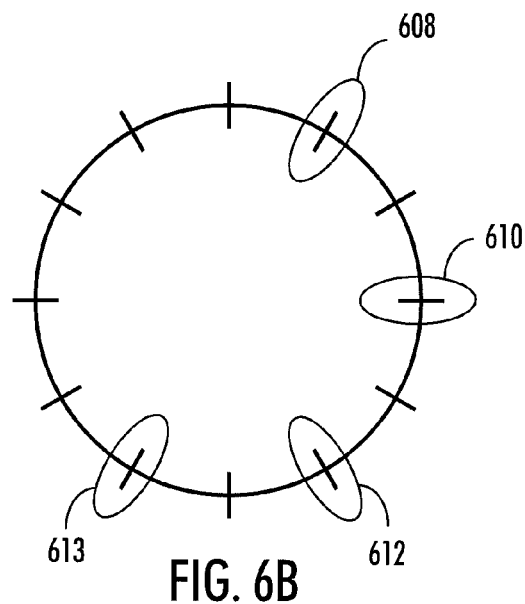

FIGS. 6A and 6B illustrate en example where user equipment transmits four streams with separate reference signals. The four streams 600, 602, 604, 606 are achieved with four antennas. In this example, each stream is separated from each other by using a different cyclic shift. In addition. In this example, the cyclic shift $n_{CS}$ 608 of the first stream 600 is 1. Streams 602, 604 and 606 are separated from other streams by applying cyclic shift increment value $\Delta_{CS}^{DMRS}$ for each stream. In this example, $\Delta_{CS}^{DMRS}=2$, thus cyclic shifts $n_{CS}$ 610, 612 and 613 of these streams have values 3, 5 and 7. In addition, adjacent streams may apply different block spreading to provide further separation.

Figure 6C:
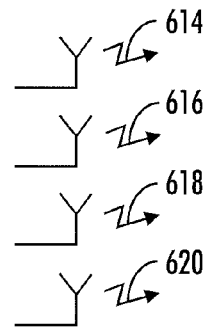
Figure 6D:
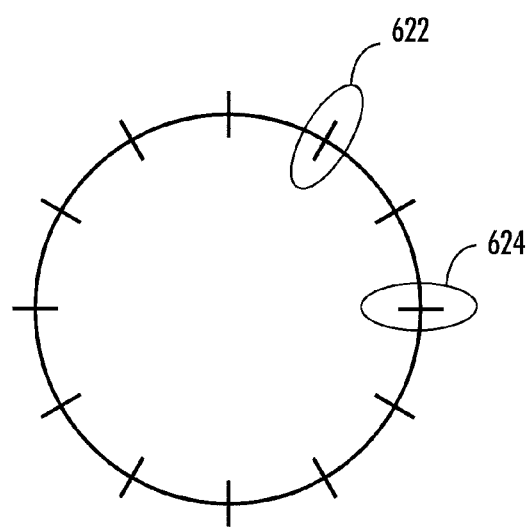

FIGS. 6C and 6D illustrate another example where user equipment is transmitting four streams with separate reference signals. Also in this example, the four streams 614, 616, 618, 620 are achieved with four antennas. In this example, streams 614, 616 are transmitted using the same cyclic shift 622. In this example, the cyclic shift $n_{CS}$ 622 of these streams is 1. The reference signals of these transmissions 614, 616 are separated from each other using block level spreading. In a similar manner, streams 618, 620 are transmitted using the same cyclic shift 624. The streams are separated from other streams by applying cyclic shift increment value $\Delta_{CS}^{DMRS}$ for the streams. In this example, $\Delta_{CS}^{DMRS}=2$, thus cyclic shifts $n_{CS}$ 624 of these streams have a value of 3. The reference signals of these transmissions 618, 620 are separated from each other using block level spreading.

In an embodiment, a network element may be configured to control transmission utilizing three or four antenna ports or spatial layers of user equipment and separate the reference signals of two antenna ports or layers with block level spreading and the reference signals of the remaining antenna ports or layers with cyclic shifting.

In another embodiment, a network element may be configured to control transmission utilizing up to four antenna ports or spatial layers of user equipment and apply cyclic shifting to all antenna ports or layers and block level spreading over two or two pairs of layers.

In an embodiment, the cyclic shifts of reference signals are mapped into dedicated reference signal blocks.

In yet another embodiment, the cyclic shifts of reference signals are mapped into multiple OFDM blocks (staggered reference signal mapping with OFDM optimized demodulation reference signal arrangement).

FIGS. 7A and 7B illustrate an example where an embodiment of the invention is applied in a system utilizing Coordinated Multi-Point transmission. FIG. 7A shows a set of cells of a wireless communication system. The cells 700, 702, 704, 706 belonging to the same Coordinated Multi-Point area, i.e. collaboration area, are shaded with hatch interior fill in FIG. 7A. These cells are served by base stations 708, 710, 712 and 714. In the collaboration area, the reference signals of user equipment are jointly managed. The joint demodulation reference signal assignment comprises coordinated division of orthogonal demodulation reference signal resources including the use of cyclic shifts and orthogonal cover codes (block spreading codes) and IFDM. Thus, in the collaboration area, the reference signals are based on the same ZC sequence. In other words, the cells share the same root sequence.

Let us assume in this example that there are four users utilizing SU-MIMO transmission in the collaboration area. Each user utilizes two transmission streams. Thus, each user requires two reference signals. FIG. 7B illustrates an example of a possible resource signal arrangement between four simultaneous users. Each user equipment transmits two reference signals, which are denoted in the clock of FIG. 7B as a hexagon and an ellipse.

The first reference signal of the first user has been allocated cyclic shift 0. The first reference signal of the second, third and fourth users has been allocated cyclic shift 3, 6 and 9, respectively. Let us further assume that in the collaboration area $\Delta_{CS}^{DMRS}=1$. As equations 3 and 4 indicate, $\Delta_{CS}^{DMRS}$ is not taken into account when allocating cyclic shift of the first reference signals of user equipment. However, $\Delta_{CS}^{DMRS}$ determines the cyclic shift of the second reference signal of each user in relation to the first reference signal of the same user equipment. Thus, the second reference signal of the first user equipment has a cyclic shift value 1.

As FIG. 7B illustrates, the reference signals 716 of the first user equipment have cyclic shift values 0 and 1. The reference signals 718 of the second user equipment have cyclic shift values 3 and 4. The reference signals 720 of the third user equipment have cyclic shift values 6 and 7. Finally, the reference signals 722 of the fourth user equipment have cyclic shift values 9 and 10.

In the example of FIGS. 7A and 7B, different user equipment have been allocated separate from each other. Thus the separation between reference signals of different users has been prioritized. As discussed earlier, another strategy would be to prioritise the CS separation of reference signals of the same UE.

FIGS. 7C and 7D illustrate another example where an embodiment of the invention is applied in a system utilizing Coordinated Multi-Point transmission. In the example of FIG. 7C, the cells 700, 702, and 706 belong to the same Coordinated Multi-Point area, i.e. collaboration area. The cells are shaded with hatch interior fill in the figure. These cells are served by base stations 708, 710, and 714.

In this example, there are three users utilizing SU-MIMO transmission in the collaboration area. Each user utilizes two transmission streams. Thus, each user requires two reference signals. FIG. 7D illustrates an example of a possible resource signal arrangement between three simultaneous users. Each user equipment transmits two reference signals, which are denoted in the clock of FIG. 7B as a hexagon and an ellipse.

The first reference signal of the first user has been allocated cyclic shift 0. The first reference signal of the second and third users has been allocated cyclic shift 4 and 8, respectively. Let us further assume that in the collaboration area $\Delta_{CS}^{DMRS}=2$. $\Delta_{CS}^{DMRS}$ determines the cyclic shift of the second reference signal of each user in relation to the first reference signal of the same user equipment. Thus, the second reference signal of the first user equipment has a cyclic shift value of 2.

As FIG. 7D illustrates, the reference signals 724 of the first user equipment have cyclic shift values 0 and 2. The reference signals 726 of the second user equipment have cyclic shift values 4 and 6. The reference signals 728 of the third user equipment have cyclic shift values 8 and 10.

In the example of FIGS. 7C and 7D, the separation between reference signals of different user equipment have been prioritized.

Figure 8A:
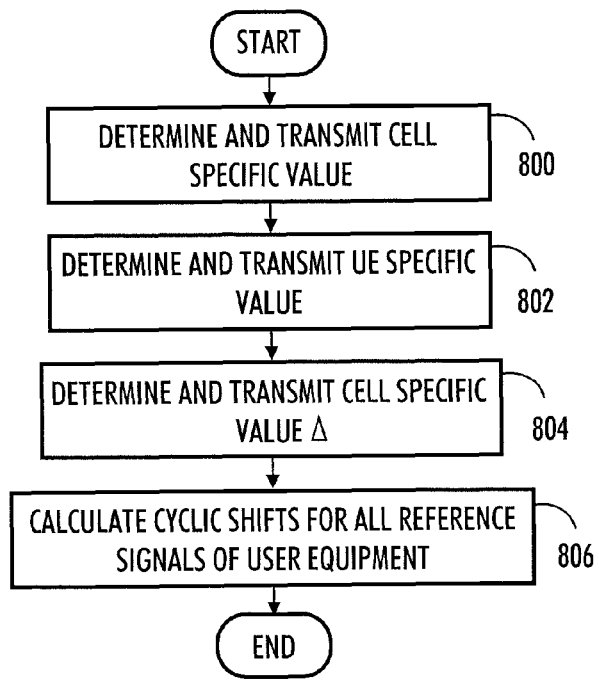
FIGS. 8A and 8B are flow charts illustrating embodiments of the invention.

FIG. 8A is a flow chart illustrating a non-limiting embodiment of the invention. In step 800, a network element determines a cell specific value $n_{DMRS}^{(1)}$. The value is broadcast to every user equipment in the cell.

In step 802, the network element determines a user equipment specific value $n_{DMRS}^{(2)}$. The value may be transmitted to the user equipment in connection with an uplink scheduling assignment.

In step 804, the network element determines the cell specific value $\Delta_{CS}^{DMRS}$. The value is transmitted to user equipment. It must be noted here that the steps 800 to 804 may be executed in any order and at different time instants.

In step 806, the network element calculates cyclic shifts for all reference signals of user equipment according to equations 3, 4 and 5.

Figure 8B:
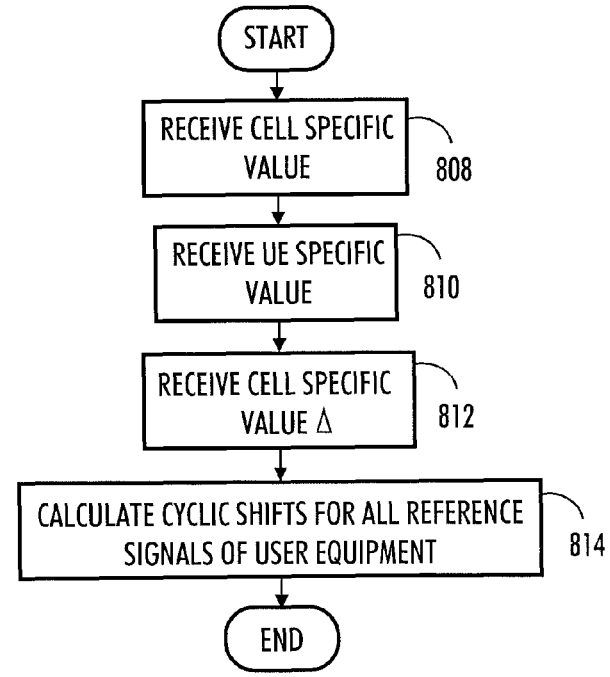

FIG. 8B is a flow chart illustrating a non-limiting embodiment of the invention from the user equipment's point of view. In step 808, the user equipment receives the cell specific value $n_{DMRS}^{(1)}$ transmitted by the base station of the cell the user equipment is connected to.

In step 810, the user equipment receives a user equipment specific value $n_{DMRS}^{(2)}$ from the base station. The value may be received in connection with an uplink scheduling assignment.

In step 812, the user equipment receives the cell specific value $\Delta_{CS}^{DMRS}$ from the base station. Again, steps 808 to 812 may be executed in any order and at different time instants.

In step 814, user equipment calculates cyclic shifts for all reference signals of user equipment according to equations 3, 4 and 5.

The steps, signalling messages and related functions described in FIGS. 1 to 8B are in no absolute chronological order, and some of the steps may be performed simultaneously or in an order differing from the given one. Other functions can also be executed between the steps or within the steps and other signalling messages sent between the illustrated messages. Some of the steps can also be left out or replaced with a corresponding step. The signalling messages are only exemplary and may even comprise several separate messages for transmitting the same information. In addition, the messages may also contain other information.

An apparatus able to perform the above-described steps may be implemented as an electronic digital computer, which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

An embodiment provides a computer program embodied on a distribution medium, comprising program instructions which, when loaded into an electronic apparatus, are configured to control the cyclic shift of reference signals of user equipment utilizing single user multiple input multiple output transmission as described above.

The computer program may be in source code form, object code form, or in some intermediate form, and it may be stored in some sort of carrier, which may be any entity or device capable of carrying the program. Such carriers include a record medium, computer memory, read-only memory, an electrical carrier signal, a telecommunications signal, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus 800, the necessary processing capacity, production costs, and production volumes, for example.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus comprising:
   one or more antenna ports;
   one or more processors; and
   one or more memories including computer program code, the one or more memories and the computer program code configured, with the one or more processors, to cause the apparatus to perform at least the following:
   share a cyclic shift space of reference signals of user equipment utilizing single user multiple input multiple output transmission by applying a cyclic shift increment value between reference signals of different antenna ports or spatial layers of the user equipment transmission; and
   generate an antenna port or a spatial layer specific cyclic shift value as a combination of a cell specific value, a user specific value, an antenna port or a spatial layer separation value, and a cell specific pseudorandom value.

2. The apparatus of claim 1, wherein the one or more memories and the computer program code are configured, with the one or more processors, to share a cyclic shift space of reference signals between different cells or different users.

3. The apparatus of claim 1, wherein the one or more memories and the computer program code are configured, with the one or more processors, to determine the antenna port or a spatial layer separation value as a combination of a cyclic shift increment value and a reference signal index.

4. The apparatus of claim 3, wherein the one or more memories and the computer program code are configured, with the one or more processors, to apply a cyclic shift increment value obtained according to a formula $$\min\left(\left\lfloor\frac{N_{CS}}{M \cdot N_{tx}}\right\rfloor, CS_{min}\right),$$

where $N_{cs}$ is the total number of available cyclic shifts, M is the number of user equipment or cells, $CS_{min}$ is the minimum supported cyclic shift separation, and $N_{tx}$ is the maximum number of reference signals per user equipment.

5. The apparatus of claim 3, wherein the one or more memories and the computer program code are configured, with the one or more processors, to apply a cyclic shift increment value obtained according to a formula $$\min\left(\left\lfloor\frac{N_{CS}}{N_{tx}}\right\rfloor, CS_{min}\right),$$

where $N_{cs}$ is the total number of available cyclic shifts, $CS_{min}$ is the minimum supported cyclic shift separation, and $N_{tx}$ is the maximum number of reference signals per user equipment.

6. The apparatus of claim 1, wherein the one or more memories and the computer program code are configured, with the one or more processors, to receive information regarding the configurable cyclic shift increment over a wireless link.

7. The apparatus of claim 1, wherein the one or more memories and the computer program code are configured, with the one or more processors, to utilize block level spreading in the transmission of more than one reference signal.

8. The apparatus of claim 7, wherein the one or more memories and the computer program code are configured, with the one or more processors, to control transmission utilizing three or four antenna ports or spatial layers and separate the reference signals of two or two pairs of antenna ports or layers with block level spreading and apply different cyclic shift to antenna ports or layers having the same block level spread.

9. The apparatus of claim 1, wherein the one or more memories and the computer program code are configured, with the one or more processors, to control transmission utilizing up to four antenna ports or spatial layers and apply cyclic shifting to all antenna ports or layers and block level spreading over two antenna ports or layers or two pairs of antenna ports or layers.

10. The apparatus of claim 1, wherein the one or more memories and the computer program code are configured, with the one or more processors, to apply a cell specific cyclic shift increment between reference signals.

11. A method comprising:
sharing a cyclic shift space of reference signals of user equipment utilizing single user multiple input multiple output transmission by applying a cyclic shift increment value between reference signals of different antenna ports or spatial layers of the user equipment transmission; and
generating an antenna port or a spatial layer specific cyclic shift value as a combination of a cell specific value, a user specific value, an antenna port or a spatial layer separation value, and a cell specific pseudo-random value.

12. The method of claim 11, further comprising:
sharing a cyclic shift space of reference signals between different cells or different users.

13. The method of claim 11, further comprising:
determining the antenna port or the spatial layer separation value as a combination of a cyclic shift increment value and a reference signal index.

14. The method of claim 11, further comprising:
controlling transmission utilizing three or four antenna ports or spatial layers and separating the reference signals of two or two pairs of antenna ports or layers with block level spreading and applying different cyclic shift to antenna ports or layers having the same block level spread.

15. The method of claim 11, further comprising:
controlling transmission utilizing up to four antenna ports or spatial layers and applying cyclic shifting to all antenna ports or layers and block level spreading over two antenna ports or layers or two pairs of layers.

16. The method of claim 11, further comprising:
receiving information regarding the configurable cyclic shift increment over a wireless link.

17. An apparatus comprising:
one or more processors; and
one or more memories including computer program code, the one or more memories and the computer program code configured, with the one or more processors, to cause the apparatus to perform at least the following:
control the cyclic shift of reference signals of user equipment utilizing single user multiple input multiple output transmission by determining a cyclic shift increment value between reference signals of different user equipment, antenna ports or spatial layers of the user equipment transmission; and
receive an antenna port or a spatial layer specific cyclic shift value as a combination of a cell specific value, a user specific value, an antenna port or a spatial layer separation value, and a cell specific pseudorandom value.

18. The apparatus of claim 17, wherein the one or more memories and the computer program code are configured, with the one or more processors, to generate a cyclic shift increment value according to the formula $$\min\left(\left\lfloor\frac{N_{CS}}{M\cdot N_{tx}}\right\rfloor, CS_{min}\right),$$

where $N_{CS}$ is the total number of available cyclic shifts, M is the number of user equipment or cells, $CS_{min}$ is the minimum supported cyclic shift separation, and $N_{tx}$ is the maximum number of reference signals per user equipment.

19. The apparatus of claim 17, wherein the one or more memories and the computer program code are configured, with the one or more processors, to generate a cyclic shift increment value according to the formula $$\min\left(\left\lfloor\frac{N_{CS}}{N_{tx}}\right\rfloor, CS_{min}\right),$$

where $N_{cs}$ is the total number of available cyclic shifts, $CS_{min}$ is the minimum supported cyclic shift separation, and $N_{4x}$ is the maximum number of reference signals per user equipment.

20. The apparatus of claim 17, wherein the one or more memories and the computer program code are configured, with the one or more processors, to broadcast information regarding the cyclic shift increment value over a wireless link.

21. A method comprising:
controlling the cyclic shift of reference signals of user equipment utilizing single user multiple input multiple output transmission by determining a cyclic shift increment value between reference signals of different user equipment, antenna ports or spatial layers of the user equipment transmission; and
receiving an antenna port or a spatial layer specific cyclic shift value as a combination of a cell specific value, a user specific value, an antenna port or a spatial layer separation value, and a cell specific pseudorandom value.

22. The method of claim 21, further comprising:
generating a cyclic shift increment value according to the formula $$\min\left(\left\lfloor \frac{N_{CS}}{M \cdot N_{tx}} \right\rfloor, CS_{min}\right),$$

where $N_{CS}$ is the total number of available cyclic shifts, M is the number of user equipment or cells, $CS_{min}$ is the minimum supported cyclic shift separation, and $N_{tx}$ is the maximum number of reference signals per user equipment.

23. The method of claim 21, further comprising:
generating a cyclic shift increment value according to the formula $$\min\left(\left\lfloor \frac{N_{CS}}{N_{tx}} \right\rfloor, CS_{min}\right),$$

where $N_{cs}$ is the total number of available cyclic shifts, $CS_{min}$ is the minimum supported cyclic shift separation, and $N_{tx}$ is the maximum number of reference signals per user equipment.

24. The method of claim 21, further comprising:
broadcasting information regarding the cyclic shift increment value over a wireless link.

25. A non-transitory processor-readable storage medium embodying a program of instructions executable by a processor to perform actions directed toward sharing a cyclic shift space of reference signals of user equipment utilizing single user multiple input multiple output transmission, the actions comprising:
applying a cyclic shift increment value between reference signals of different antenna ports or spatial layers of the user equipment transmission; and
generating an antenna port or a spatial layer specific cyclic shift value as a combination of a cell specific value, a user specific value, an antenna port or a spatial layer separation value, and a cell specific pseudo-random value.

26. The non-transitory processor-readable storage medium of claim 25, the actions further comprising:
controlling transmission utilizing three or four spatial layers and separating the reference signals of two antenna ports or layers with block level spreading and the reference signals of the remaining antenna ports or layers with cyclic shifting.

27. The non-transitory processor-readable storage medium of claim 25, the actions further comprising:
controlling transmission utilizing up to four spatial layers and applying cyclic shifting to all layers and block level spreading over two layers or two pairs of layers.

28. A non-transitory processor-readable storage medium embodying a program of instructions executable by a processor to perform actions directed toward controlling the cyclic shift of reference signals of user equipment utilizing single user multiple input multiple output transmission, the actions comprising:
determining a cyclic shift increment value between reference signals of different user equipment, antenna ports or spatial layers of the user equipment transmission; and
receiving an antenna port or a spatial layer specific cyclic shift value as a combination of a cell specific value, a user specific value, an antenna port or a spatial layer separation value, and a cell specific pseudorandom value.

29. The non-transitory processor-readable storage medium of claim 28, further comprising:
broadcasting information regarding the cyclic shift increment value over a wireless link.

30. The non-transitory processor-readable storage medium of claim 28, further comprising:
generating a cyclic shift increment value according to the formula $$\min\left(\left\lfloor \frac{N_{CS}}{M \cdot N_{tx}} \right\rfloor, CS_{min}\right),$$

where $N_{cs}$ is the total number of available cyclic shifts, M is the number of user equipment or cells, $CS_{min}$ is the minimum supported cyclic shift separation, and $N_{tx}$ is the maximum number of reference signals per user equipment.

31. The non-transitory processor-readable storage medium of claim 28, further comprising:
generating a cyclic shift increment value according to the formula $$\min\left(\left\lfloor \frac{N_{CS}}{N_{tx}} \right\rfloor, CS_{min}\right),$$

where $N_{cs}$ is the total number of available cyclic shifts, $CS_{min}$ is the minimum supported cyclic shift separation, and $N_{tx}$ is the maximum number of reference signals per user equipment.

* * * * *

UNITED STATES PATENT AND TRADEMARK OFFICE
CERTIFICATE OF CORRECTION

PATENT NO. : 8,989,308 B2  
APPLICATION NO. : 13/202599  
DATED : March 24, 2015  
INVENTOR(S) : Hooli et al.

Page 1 of 1

It is certified that error appears in the above-identified patent and that said Letters Patent is hereby corrected as shown below:

On the title page item [73] delete "Nokia Siemens Networks Oy" and insert --Nokia Solutions and Networks Oy--.

Signed and Sealed this  
Sixteenth Day of February, 2016

Michelle K. Lee  
*Director of the United States Patent and Trademark Office*